US009077049B2

(12) United States Patent
Gaugler et al.

(10) Patent No.: US 9,077,049 B2
(45) Date of Patent: Jul. 7, 2015

(54) METAL-AIR CELL HAVING HIGH CAPACITY

(75) Inventors: Winfried Gaugler, Ellwangen-Eigenzell (DE); Wolf-U. Barenthin, Ellwangen (DE); Rolf Brenner, Ellwangen (DE)

(73) Assignee: Varta Microbattery GmbH (DE)

( * ) Notice: Subject to any disclaimer, the term of this patent is extended or adjusted under 35 U.S.C. 154(b) by 50 days.

(21) Appl. No.: 13/817,051

(22) PCT Filed: Aug. 18, 2011

(86) PCT No.: PCT/EP2011/064209
§ 371 (c)(1),
(2), (4) Date: Feb. 20, 2013

(87) PCT Pub. No.: WO2012/022778
PCT Pub. Date: Feb. 23, 2012

(65) Prior Publication Data
US 2013/0183596 A1 Jul. 18, 2013

(30) Foreign Application Priority Data
Aug. 20, 2010 (DE) .................. 10 2010 039 557

(51) Int. Cl.
H01M 6/12 (2006.01)
H01M 12/06 (2006.01)
H01M 4/24 (2006.01)
H01M 10/12 (2006.01)
H01M 10/28 (2006.01)
H01M 10/04 (2006.01)
H01M 2/02 (2006.01)
H01M 12/08 (2006.01)
H01M 2/04 (2006.01)

(52) U.S. Cl.
CPC ............ *H01M 12/06* (2013.01); *H01M 2/0465* (2013.01); *Y02E 60/128* (2013.01); *H01M 4/244* (2013.01); *H01M 10/124* (2013.01); *H01M 10/285* (2013.01); *H01M 10/0427* (2013.01); *H01M 2/0222* (2013.01); *H01M 12/08* (2013.01)

(58) Field of Classification Search
CPC ... H01M 12/06; H01M 12/08; H01M 2/0222; H01M 4/244; H01M 10/0427; H01M 10/124; H01M 10/285; H01M 2/0465; Y02E 60/128
USPC .................. 429/145, 157, 162, 163, 229, 231
See application file for complete search history.

(56) References Cited

U.S. PATENT DOCUMENTS

| 4,118,544 A | 10/1978 | Przybyla et al. |
| 6,040,074 A * | 3/2000 | Adey et al. .................... 429/405 |
| 6,284,400 B1 | 9/2001 | Adey et al. |
| 2007/0054168 A1 | 3/2007 | Chang et al. |

FOREIGN PATENT DOCUMENTS

| DE | 37 22 019 A1 | 1/1989 |
| DE | 694 30 477 T2 | 11/2002 |

* cited by examiner

Primary Examiner — Patrick Ryan
Assistant Examiner — Ben Lewis
(74) Attorney, Agent, or Firm — DLA Piper LLP (US)

(57) ABSTRACT

A zinc-air button cell comprising a zinc-containing anode and an air cathode as electrochemical active components and a casing surrounding the anode and the cathode and having 1 to 128 inlet openings through which atmospheric oxygen can enter the casing, wherein 1) the casing comprises a cell cup and a cell lid, 2) the inlet openings are introduced in a bottom portion of the cell cup, 3) at least a part of the inlet openings has an opening area of $<0.025$ mm$^2$, and 4) the air cathode is a substantially flat layer and seated directly on the bottom portion of the cell cup.

9 Claims, 1 Drawing Sheet

METAL-AIR CELL HAVING HIGH CAPACITY

RELATED APPLICATIONS

This is a §371 of International Application No. PCT/EP2011/064209, with an international filing date of Aug. 18, 2011 (WO 2012/022778 A1, published Feb. 23, 2012), which is based on German Patent Application No. 10 2010 039 557.9, filed Aug. 20, 2010, the subject matter of which is incorporated herein by reference.

TECHNICAL FIELD

This disclosure relates to a metal-air button cell, in particular to a zinc-air button cell.

BACKGROUND

Generally, metal-air cells comprise a metal-based anode and an air cathode as electrochemical active components separated from one another by an ion-conductive electrolyte. During discharge, oxygen is reduced at the air cathode with a gain of electrons. Hydroxide ions develop which can move to the anode via the electrolyte. There, a metal is oxidized with a loss of electrons. The developing metal ions react with the hydroxide ions.

Both primary and secondary metal-air cells have been developed. A secondary metal-air cell can be recharged by applying a voltage between anode and cathode and reversing the electrochemical reaction described above. Oxygen is released during this process.

The most popular example of a metal-air cell is the zinc-air cell. Button cells are particularly used as batteries for hearing aids.

Button cells involve, as generally known, cells having a height-diameter-ratio of less than 1. They usually comprise a liquid-tight casing composed of a bowl-shaped cell cup, a bowl-shaped cell lid and a seal. Cell cup and cell lid usually comprise in each case a bottom, a circumferential shell, a transition zone connecting the bottom and the shell, and a terminal cutting edge.

In a preferable configuration, the bottom of the cell cup and the bottom of the cell lid are planar and preferably circular, where necessary also oval. The shell of the cell cup and the shell of the cell lid can preferably be described as ring-shaped segments of a hollow cylinder having a circular or oval cross-section. Generally, the shells of the cell cup and cell lid are oriented orthogonally in relation to the corresponding bottoms.

The above-mentioned transition zones of the cell cup and cell lid preferably comprise those parts of the cell cup and cell lid outside of the plane of the respective bottom, but that are not yet part of the corresponding shell. The transition zones can be configured rounded-off, for example, in the shape of a shoulder or they may also have the form of a sharp edge.

Cell cups and cell lids are preferably manufactured from metallic materials such as nickel-coated steel or metal sheets. Furthermore, in particular also tri-metals are suitable, for example, having the sequence nickel, steel and cupper (from outside to inside).

When assembling a button cell casing, the cell lid with cutting edge ahead is inserted into the cell cup. The two parts are separated spatially and electrically from one another in the resulting casing by the above-mentioned seal which hence not only assumes sealing functions, but also insulating functions. Furthermore, the bottoms of the cell cup and cell lid are arranged parallel to one another in the resulting casing. The distance between the bottoms defines the height of the button cell. A straight line connecting the center points of the bottoms defines the reference axis (axial direction) along which insertion of the cell lid into the cell cup is effected when assembling the button cell.

For example, the cell cup and cell lid can be manufactured from nickel-coated deep-drawn metal sheets as punch-drawn parts. Usually, the cell cup forms the positive terminal and the cell lid forms the negative terminal. The liquid-tight sealing of such cells is often achieved by crimping the edge of the cell cup.

Metal-air cells have a relatively high energy density because the demand for oxygen at the cathode can be covered by atmospheric oxygen from the surroundings. Correspondingly, however, targeted measures are required to supply the cathode with oxygen from the surrounding air during the discharge process. And, vice versa, oxygen developing at the air cathode is to be lead off during the charging process. For this purpose, the casings of metal-air cells are systematically provided with inlet or outlet openings, respectively. Generally, this is effected by punching holes into the casings. Within the casings, the fine diffusion of the entering atmospheric oxygen is usually effected via suitable membranes or filters. Thus, the casing of zinc-air button cells is generally manufactured by use of a cell cup with air inlet holes punched into the bottom thereof.

For the manufacture of zinc-air button cells, a filter paper (or any other suitable, micro-porous layer) is inserted into such a cell cup to cover the bottom of the cup and the air inlet holes punched therein. Within the cell, the filter paper serves as a means for fine diffusion of atmospheric oxygen entering via the air inlet holes.

U.S. Pat. No. 4,118,544 discloses a button cell having such a means for air diffusion. In the case of the button cell described in U.S. '544, entry of air into the cell is regulated by a micro-porous layer or by the size of the air inlet holes. The size of the pores of the micro-porous layer or of the air inlet holes restricts the electric power of the cell. However, the cells shall temporarily also be capable of discharging higher currents. This is possible since in the cell, functionally analogous to the aforementioned filter paper, a layer for air diffusion (air diffusion layer) is provided where a certain amount of oxygen is stored.

Subsequently, the air cathode is laid onto the filter paper where the reduction of atmospheric oxygen can be effected. In turn, the cathode is covered with a planar separator forming the boundary layer between the cathode zone and the anode zone in the cell. Generally, such a pre-assembled cup part is combined with a bowl-shaped cell cup filled with zinc powder or any other suitable, reducible metal as anode material as well as with an electrolyte and on whose outer side a ring-shaped plastic seal is applied. The latter is inserted into the cell cup so that the plastic seal bears between the two casing parts. The cell is sealed in a liquid-tight manner by crimping the terminal edge of the cell cup over the inserted cell lid.

It could thus be helpful to provide a metal-air button cell having a simplified structure and an improved capacity.

SUMMARY

We provide a zinc-air button cell including a zinc-containing anode and an air cathode as electrochemical active components and a casing surrounding the anode and the cathode and having 1 to 128 inlet openings through which atmospheric oxygen can enter the casing, wherein 1) the casing includes a cell cup and a cell lid, 2) the inlet openings are introduced in a bottom portion of the cell cup, 3) at least a part of the inlet openings has an opening area <0.025 mm², and 4) the air cathode is a substantially flat layer and seated directly on the bottom portion of the cell cup.

We also provide a metal-air button cell including a metal-containing anode and an air cathode as electrochemical active components and a casing surrounding the anode and the cathode and having inlet openings through which atmospheric oxygen can enter the casing, wherein 1) the casing includes a cell cup and a cell lid, 2) the inlet openings are introduced in a bottom portion of the cell cup, 3) at least a part of the inlet openings has an opening area <0.025 mm², and 4) the air cathode is a substantially flat layer and seated directly on the bottom portion of the cell cup.

DETAILED DESCRIPTION

Figure 1:
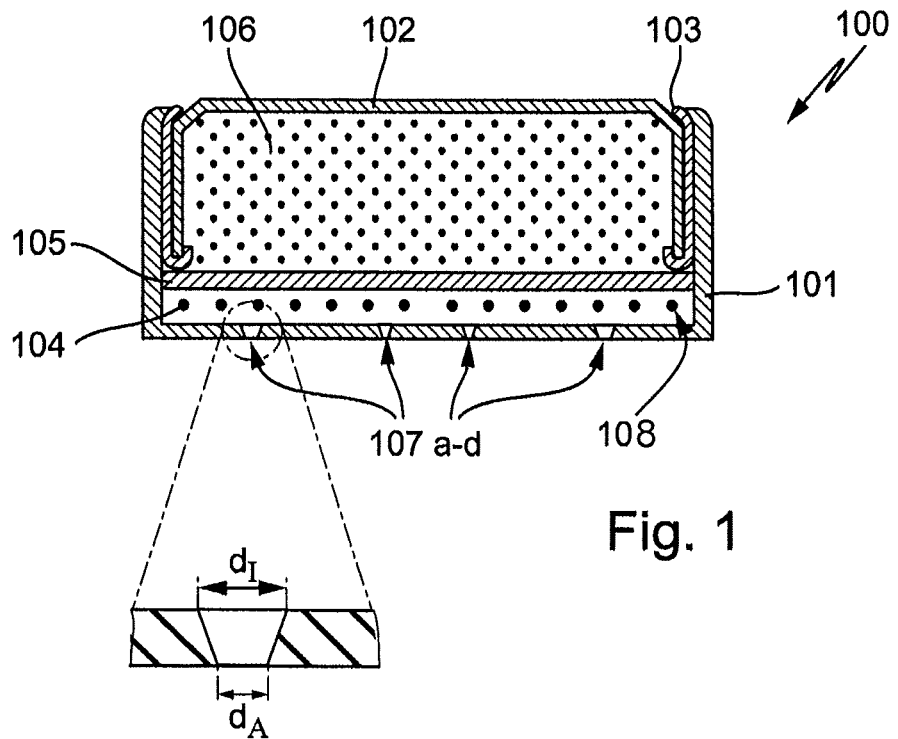
FIG. 1 schematically shows a cross-section of a metal-air button cell 100.

Our metal-air button cell in particular involves a zinc-air button cell, i.e., a button cell where the anode contains metallic zinc or where the anode consists of metallic zinc. Instead of zinc, for example, also aluminum or magnesium can be used as electrochemical active material. The metal-air button cell can as well be a primary or a secondary (rechargeable) metal-air button cell.

The casing of the metal-air button cell is generally not different from the one of classic button cells. It may comprise the aforementioned components, namely a cell cup, a cell lid and a seal. Reference is hereby made to the corresponding explanations of these parts.

Furthermore, just as the casings of known button cells, the casing of the button cell comprises inlet openings in the form of holes through which atmospheric oxygen can enter the casing. These inlet openings are preferably configured as round holes.

One of the central features is that at least a part of the inlet openings or of the holes in the casing of a button cell has an opening area <0.025 mm², preferably <0.01 mm². Particularly preferably, the opening area of these inlet openings is 0.00000000785 mm² to 0.00785 mm², in particular 0.0000196 mm² to 0.00709 mm².

The casings of classic metal-air button cells usually comprise significantly bigger inlet openings. For example, holes having diameters of 0.4 mm (corresponds to an area of approx. 0.125 mm² in the case of essentially circular holes) and more as inlet openings are no exception. In the case of our button cells, these holes were at least partially replaced by significantly smaller inlet openings, providing major advantages. Namely we found that such small holes can simultaneously assume the function of a means for fine diffusion of atmospheric air entering through the inlet holes. The described insertion of a filter paper or of a functionally equivalent micro-porous material can correspondingly be dispensed with in the manufacture of metal-air button cells, significantly simplifying the manufacturing process.

The zinc-air cells described in the aforementioned U.S. '544 also comprise very small air inlet openings. However, U.S. '44 did not discover that by introducing particularly small holes in the casing, an abandonment of the aforementioned layer for air diffusion (air diffusion layer) is made possible. By elimination of that layer, more internal volume is available for active material. Our button cell is particularly characterized in that no separate means for air diffusion, e.g., functionally corresponding to a filter paper, is arranged between the inlet openings in the casing and the air cathode. Our cells therefore generally have a much higher capacity than comparable classic button cells.

Thus, the total number of inlet openings in our button cells is 1 to 128, preferably 2 to 48, particularly preferably 4 to 36, in particular 8 to 32.

The button cell preferably comprises exclusively inlet openings which have an opening area with the sizes mentioned <0.025 mm². However, our cells may also comprise one or more bigger inlet openings with opening areas >0.025 mm² in addition to the inlet openings with the opening area <0.025 mm².

The inlet openings are preferably introduced in the bottom of the cell cup of a button cell. An air cathode inserted into the cell cup can receive a direct flow of entering atmospheric oxygen. The button cell preferably comprises an air cathode in the form of a flat layer which covers the bottom of the cell cup, in particular the inlet openings introduced therein such that atmospheric oxygen entering through the inlet openings cannot enter the casing, while bypassing the air cathode.

The air cathode can be separated from the bottom of the cell cup with a spacer, for example, a flat mesh or net. However, preferably, the cathode is seated directly and immediately on the bottom.

Particularly preferably, plastic-bonded gas diffusion electrodes in the form of flat layers are used as air cathodes in metal-air button cells. Such gas diffusion electrodes are described, for example, in DE 37 22 019 A1. In such electrodes, a plastic binder (mostly polytetrafluoroethylene, PTFE) forms a porous matrix into which particles of an electro-catalytically active material (e.g., of a precious metal such as platinum or palladium or of a manganese oxide) are intercalated. These have to be able to catalyze the aforementioned reaction of atmospheric oxygen. Generally, production of such electrodes is effected by rolling a dry mixture of the binder and the catalyst into a foil. In turn, the latter can be rolled into a metal mesh, for example, made of silver, nickel or silver-coated nickel. The metal mesh forms a conductor structure within the electrode and serves as a current conductor. Alternatively or additionally, a metal mesh or a metal net can be laid onto the bottom of the cell cup of a button cell prior to the layer-shaped air cathode being inserted into the cell cup. It may then serve as a current conductor and/or as the aforementioned spacer.

Particularly preferably, the inlet openings are equally distributed over the bottom of the cell cup. Equal distribution shall particularly mean that when dividing the bottom into two equally-sized areas by a straight, each of these sectors has a similar number of inlet openings, preferably the same number. In this case, the arrangement of the inlet openings can generally be varied in any manner. They can, for example, be arranged in the form of concentric circles or in the type of a grid.

Generally, the casing of a button cell, in particular of a zinc-air button cell, has a thickness of 0.08 to 0.15 mm. This applies in particular to the region punctured by the inlet openings, i.e., in particular to the bottom of the aforementioned cell cup.

As mentioned above, the inlet openings are preferably configured as round holes. However, these do not necessarily need to have a constant hole diameter. Particularly preferably, the holes are conically-widened towards the casing inner side as viewed from the casing outer side. Thus, the hole diameter increases from outside to inside.

At this point, a brief explanation of the term "opening area" is provided: If the cross-section of the holes or of the inlet openings varies in longitudinal direction (i.e., from the casing outer side to the casing inner side or vice versa), the opening area corresponds to the smallest measurable cross-section in longitudinal direction. Apart from that, the opening area corresponds to the (constant) cross-sectional area of the holes or of the inlet openings.

The smallest measurable diameter of the holes or of the inlet openings, in particular of the inlet openings configured as round holes, preferably does not exceed the limit value of 0.15 mm, particularly preferred it is below 0.1 mm. Particularly preferably, the smallest measurable diameter of the inlet openings is 0.0001 mm to 0.1 mm, in particular 0.005 mm to 0.095 mm.

For the manufacture of a metal-air button cell, electrochemical active components, for example, the above-mentioned zinc anode and the aforementioned air-cathode, are sealed into a casing comprising the described inlet openings for atmospheric oxygen, in particular configured as round holes, with the opening area <0.025 $mm^2$, preferably <0.01 $mm^2$.

For example, for the manufacture of a zinc-air button cell, a bowl-shaped cell cup can be provided having inlet openings configured as round holes in the bottom region having a diameter of 10 μm to 100 μm. As mentioned above, insertion of a filter paper as atmospheric oxygen diffuser can be dispensed with. Instead, the internal bottom of the cell cup is preferably immediately covered with a flat air cathode layer where reduction of atmospheric oxygen supplied through the inlet openings can be effected. Apart from that, the procedure is known.

Particularly preferably, the inlet openings for atmospheric oxygen having an opening area <0.025 $mm^2$ are molten into the casing by a laser. Thus, the inlet openings of the casing of a cell preferably involve round holes formed by melting target areas in the casing, and not punched holes. Correspondingly, they do not necessarily have a circular shape. In this case, the above-mentioned conical shape can be achieved by introducing the openings into the casing from the side which forms the inner side of the casing of the assembled cell.

Suitable lasers are, for example, commercially available fiber lasers, i.e., solid state lasers, where the doped core of a glass fiber forms the active medium. The operational parameters of the laser have to be adjusted as exactly as possible to the thickness of the casing in which the inlet openings are to be introduced. The power can, for example, be modulated by variation of the pulse frequency of the laser.

The above-mentioned advantages and further advantages arise in particular also from the following description of the Drawings. The individual features can be realized on their own or in any combination thereof. The examples described merely serve for explanation and for a better understanding and should not be regarded as limiting.

FIG. 1 schematically shows a cross-section of a metal-air button cell 100. Shown are the bowl-shaped cell cup 101, the cell lid 102 inserted therein which is also bowl-shaped, and the plastic seal 103 arranged there between, of which the casing of the cell is composed. The seal 103 separates the cell cup 101 and the cell lid 102 spatially and electrically from another. The casing has a cylindrical shape. On the end face side, the casing is limited by the bottoms of the cell cup 101 and the cell lid 102, on the shell side by the circumferential shell of the cell cup 101.

The air cathode 104 is contained in the cell 100 as a thin layer which completely covers the bottom of the cell cup 101. In this case, the cathode layer is seated directly and immediately on the inner bottom of the cell cup 101. It comprises a porous matrix made of a plastic, in which a catalyst is dispersed. A metal mesh 108 forms a conductor structure within the matrix. Above the cathode layer 104, the planar separator 105 is shown. The latter separates the air-cathode 104 from the anode zone 106 of the cell 100. A metal powder, in particular zinc, is introduced in the latter as active material.

The inlet openings 107a-d are molten into the bottom of the cell cup 101 by a laser. In this case, the two inlet openings on the outer side have bigger diameters than the two centrally arranged ones. One of the inlet openings is shown in an enlarged view (not true to scale). It can be seen that the inlet opening is conically widened towards the casing inner side viewed from the outer side. Thus, the inlet opening does not have a constant diameter. The diameter of the conically-configured inlet opening is approximately 15 μm ($d_A$) at the outer side, however, approximately 60 μm ($d_I$) at the inner side. The casing of the cell cup shown has a thickness of approximately 130 μm in the bottom region. Assuming that the inlet opening has a circular cross-section at the outer side (where the cross-section is the smallest), the opening area of the inlet opening can be calculated and amounts to approximately 0.0001767 $mm^2$.

Figure 2:
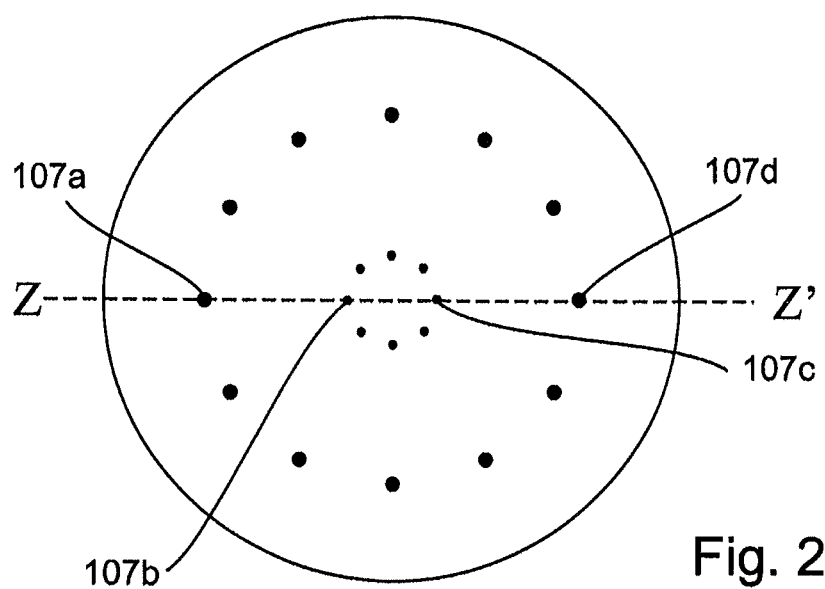
FIG. 2 shows a plan view of the bottom of the cell 100 shown in cross-sectional view in FIG. 1.

FIG. 2 shows a plan view of the bottom of the cell 100 shown in cross-sectional view in FIG. 1. The bottom is one of the two end face sides of the cell 100, the second one is formed by the bottom of the cell lid 102 inserted into the cell cup 101. The section of the cell 100 shown in FIG. 1 was effected along the Z-Z'-line. A total of 20 inlet openings for atmospheric oxygen can be recognized, among them the inlet openings 107a-d shown in the sectional view of FIG. 1. The 20 inlet openings are equally distributed over the cell bottom in the form of two concentrically-arranged circles. In this case, the inlet openings of the inner circle have smaller opening areas and diameters than the inlet openings of the outer circle.

The invention claimed is:

1. A zinc-air button cell comprising a zinc-containing anode and an air cathode as electrochemical active components and a casing surrounding the anode and the cathode and having 1 to 128 inlet openings through which atmospheric oxygen can enter the casing, wherein 1) the casing comprises a cell cup and a cell lid, 2) the inlet openings are introduced in a bottom portion of the cell cup, 3) at least a part of the inlet openings has an opening area <0.025 $min^2$, and 4) the air cathode is a substantially flat layer and seated directly on the bottom portion of the cell cup.

2. The button cell according to claim 1, wherein at least a part of the inlet openings has an opening area <0.01 $mm^2$.

3. The button cell according to claim 1, wherein the inlet openings are essentially equally distributed over the bottom portion of the cell cup.

4. The button cell according to claim 1, wherein a total number of inlet openings is 2 to 48.

5. The button cell according to claim 1, wherein a total number of inlet openings is 4 to 36.

6. The button cell according to claim 1, wherein the casing comprises inlet openings with differently-sized opening areas.

7. The button cell according to claim 1, wherein the casing has a casing thickness of 0.08 to 0.15 mm.

8. The button cell according to claim 1, wherein the inlet openings widen conically towards a casing inner side from the outside.

9. A metal-air button cell comprising a metal-containing anode and an air cathode as electrochemical active components and a casing surrounding the anode and the cathode and having inlet openings through which atmospheric oxygen can enter the casing, wherein 1) the casing comprises a cell cup and a cell lid, 2) the inlet openings are introduced in a bottom portion of the cell cup, 3) at least a part of the inlet openings has an opening area <0.025 mm$^2$, and 4) the air cathode is a substantially flat layer and seated directly on the bottom portion of the cell cup.

* * * * *